(12) United States Patent
Gibson et al.

(10) Patent No.: US 10,003,514 B2
(45) Date of Patent: Jun. 19, 2018

(54) METHOD AND SYSTEM FOR DETERMINING A DEPLOYMENT OF APPLICATIONS

(75) Inventors: Jonathan David Gibson, Austin, TX (US); Matthew A. Stuempfle, Raleigh, NC (US)

(73) Assignee: Hewlett Packard Enteprrise Development LP, Houston, TX (US)

( * ) Notice: Subject to any disclaimer, the term of this patent is extended or adjusted under 35 U.S.C. 154(b) by 1028 days.

(21) Appl. No.: 13/704,955

(22) PCT Filed: Jun. 22, 2010

(86) PCT No.: PCT/US2010/039438
§ 371 (c)(1),
(2), (4) Date: Dec. 17, 2012

(87) PCT Pub. No.: WO2011/162746
PCT Pub. Date: Dec. 29, 2011

(65) Prior Publication Data
US 2013/0097293 A1 Apr. 18, 2013

(51) Int. Cl.
*H04L 12/26* (2006.01)
*G06F 9/445* (2018.01)
(Continued)

(52) U.S. Cl.
CPC ............ *H04L 43/0876* (2013.01); *G06F 8/60* (2013.01); *G06F 9/5044* (2013.01);
(Continued)

(58) Field of Classification Search
CPC ........ G06F 8/60; G06F 9/5055; G06F 9/5044; G06F 9/45533; G06F 2009/4557; H04L 43/0876; H04L 67/30; H04L 67/10
(Continued)

(56) References Cited

U.S. PATENT DOCUMENTS 7,200,530 B2   4/2007 Brown et al.
7,506,037 B1   3/2009 Ciano et al.
(Continued)

FOREIGN PATENT DOCUMENTS

CN   1601510 A   3/2005
CN   1836208     9/2006
(Continued)

OTHER PUBLICATIONS

"Managing VMware Doesn't End with Managing VMware", netiQ, Apr. 2008. < http://download.netiq.com/CMS/WHITEPAPER/ManagingVMware.pdf >.
(Continued)

*Primary Examiner* — Patrice L Winder
*Assistant Examiner* — Ruth Solomon
(74) *Attorney, Agent, or Firm* — Mannava & Kang, P.C.

(57) ABSTRACT

There is provided a method of determining a deployment of applications in a computer system comprising a plurality of computing hardware. The method comprise obtaining, for each of a plurality of applications, a set of application characteristics, assigning each of the plurality of applications, using the obtained characteristics, to one of a plurality of predetermined application models, and determining a virtual server deployment plan and an application deployment plan, the determination based in part on characteristics of the computer system, characteristics of the applications, and application model compatibility data.

20 Claims, 5 Drawing Sheets

(51) Int. Cl.
*H04L 29/08* (2006.01)
*G06F 9/50* (2006.01)
*G06F 9/455* (2018.01)

(52) U.S. Cl.
CPC ............ *G06F 9/5055* (2013.01); *H04L 67/10* (2013.01); *H04L 67/30* (2013.01); *G06F 9/45533* (2013.01); *G06F 2009/4557* (2013.01)

(58) Field of Classification Search
USPC ............... 709/220–224, 201; 718/1; 717/177
See application file for complete search history.

(56) References Cited

U.S. PATENT DOCUMENTS

| | | | |
|---|---|---|---|
| 7,774,463 B2* | 8/2010 | Bloching et al. ............. | 709/225 |
| 7,926,051 B2* | 4/2011 | Barta ........................ | G06F 8/61 |
| | | | 717/174 |
| 8,024,396 B2* | 9/2011 | Sedukhin et al. ............ | 709/201 |
| 8,151,256 B2* | 4/2012 | Ramannavar et al. ....... | 717/168 |
| 8,181,186 B1 | 5/2012 | Holcomb et al. | |
| 8,225,308 B2* | 7/2012 | Sedukhin et al. ............ | 717/174 |
| 8,595,737 B2 | 11/2013 | Ichikawa et al. | |
| 8,667,500 B1 | 3/2014 | Ji et al. | |
| 8,825,964 B1 | 9/2014 | Sopka et al. | |
| 2002/0091702 A1 | 7/2002 | Mullins | |
| 2003/0110236 A1 | 6/2003 | Yang et al. | |
| 2003/0120780 A1 | 6/2003 | Zhu et al. | |
| 2003/0233431 A1 | 12/2003 | Reddy et al. | |
| 2003/0233432 A1 | 12/2003 | Reddy et al. | |
| 2004/0073673 A1 | 4/2004 | Santos et al. | |
| 2005/0021530 A1 | 1/2005 | Garg et al. | |
| 2005/0080811 A1* | 4/2005 | Speeter ................. | H04L 67/125 |
| 2005/0091227 A1 | 4/2005 | McCollum et al. | |
| 2005/0154788 A1 | 7/2005 | Yang et al. | |
| 2005/0204354 A1 | 9/2005 | Sundararajan et al. | |
| 2005/0283759 A1 | 12/2005 | Peteanu et al. | |
| 2006/0080413 A1* | 4/2006 | Oprea et al. ................. | 709/220 |
| 2006/0106585 A1 | 5/2006 | Brown et al. | |
| 2007/0006218 A1* | 1/2007 | Vinberg et al. ............... | 717/174 |
| 2008/0104605 A1 | 5/2008 | Steinder et al. | |
| 2008/0294777 A1 | 11/2008 | Karve et al. | |
| 2009/0012981 A1 | 1/2009 | Kogoh | |
| 2009/0070771 A1 | 3/2009 | Yuyitung et al. | |
| 2009/0106409 A1 | 4/2009 | Murata | |
| 2009/0112966 A1 | 4/2009 | Pogrebinsky et al. | |
| 2009/0150529 A1 | 6/2009 | Tripathi | |
| 2009/0204961 A1 | 8/2009 | Dehaan et al. | |
| 2009/0222560 A1 | 9/2009 | Gopisetty et al. | |
| 2009/0228589 A1 | 9/2009 | Korupolu | |
| 2010/0005173 A1 | 1/2010 | Baskaran et al. | |
| 2010/0027420 A1 | 2/2010 | Smith | |
| 2010/0030893 A1 | 2/2010 | Berg et al. | |
| 2010/0031247 A1* | 2/2010 | Arnold ...................... | G06F 8/61 |
| | | | 717/174 |
| 2010/0191854 A1 | 7/2010 | Isci et al. | |
| 2010/0250744 A1 | 9/2010 | Hadad et al. | |
| 2010/0262974 A1 | 10/2010 | Uyeda | |
| 2010/0274981 A1 | 10/2010 | Ichikawa | |
| 2010/0306735 A1 | 12/2010 | Hoff et al. | |
| 2010/0332657 A1 | 12/2010 | Elyashev | |
| 2010/0332661 A1 | 12/2010 | Tameshige | |
| 2011/0145782 A1 | 6/2011 | Brukner et al. | |
| 2011/0239189 A1* | 9/2011 | Attalla ...................... | G06F 8/65 |
| | | | 717/121 |
| 2013/0097293 A1 | 4/2013 | Gibson et al. | |
| 2013/0097597 A1 | 4/2013 | Gibson et al. | |
| 2013/0238804 A1 | 9/2013 | Tanino et al. | |

FOREIGN PATENT DOCUMENTS

| | | |
|---|---|---|
| CN | 101937357 | 1/2011 |
| JP | 2009116852 A | 5/2009 |
| JP | 2011008481 A | 1/2011 |

OTHER PUBLICATIONS

Bailey, Michelle, "The Economics of Virtualization" Moving Toward an Application-Based Cost Model, Nov. 2009.
International Search Report for PCT/US2010/039438, Korean Intellectual Property Office, dated Mar. 24, 2011.
Tickoo, Omesh et al., "Modeling Virtual Machine Performance: Challenges and Approaches", Intel Labs, Intel Corporation, vol. 37; pp. 55-60, 2010.
Extended European Search Report ~ Application No. 10853787.9-1954 dated Aug. 11, 2014 ~ 8 pages.
Extended European Search Report ~ Application No. 10853789.5-1954 dated Jun. 18, 2014 ~ 6 pages.
Extended European Search Report, EP Application No. 11863212.4, dated Feb. 16, 2016, pp. 1-7, EPO.
International Search Report and Written Opinion for PCT/US2012/039432, Korean Intellectual Property Office, dated Apr. 1, 2011.
Non-Final Office Action, U.S. Appl. No. 14/009,306, dated Oct. 4, 2017, pp. 1-29, USPTO.

* cited by examiner

METHOD AND SYSTEM FOR DETERMINING A DEPLOYMENT OF APPLICATIONS

CLAIM FOR PRIORITY

The present application is a national stage filing under 35 U.S.C 371 of PCT application number PCT/US2010/039438, having an international filing date of Jun. 22, 2010, the disclosure of which is hereby incorporated by reference in its entirety.

BACKGROUND

Many modern businesses and organizations rely heavily on information technology (IT) to provide computer-based tools and services to enable them and their customers to operate efficiently. The tools and services are typically provided by a multitude of different software applications which typically run on numerous computer servers. For reasons of efficiency, many of these computer servers are increasingly being consolidated in specialized facilities such as data centers.

Software applications may be conveniently arranged to run in a virtualized environment through use of software virtualization applications, such as virtual machines. In this way, a single computer server may effectively concurrently run multiple computer operating systems instances (or virtual images) and concurrently run different applications on each, of the virtual images.

However, due to the typical abundance of computing power available in data centers, little regard has generally been paid to the manner in which software applications and software virtualization applications are distributed over different computer servers.

BRIEF DESCRIPTION

Examples of the invention will now be described, by way of non-limiting example only, with reference to the accompanying drawings, in which.

DETAILED DESCRIPTION

Various embodiments will be described below with reference to various examples.

Figure 1:
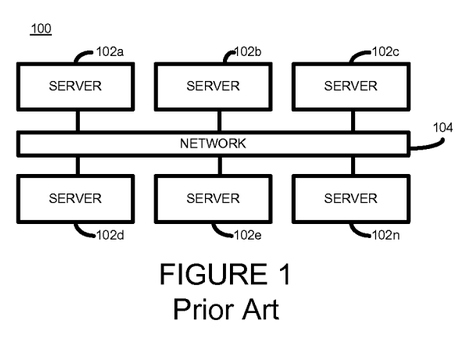
FIG. 1 is a simplified block diagram illustrating a portion of a data center.

Referring now to FIG. 1 there is shown a simplified block diagram illustrating a portion of a data center 100. The data center 100 comprises a number of computer servers 102*a* to 102*n* connected to a data center backbone network 104. Those skilled in the art will appreciate that, for clarity, not all elements of a typical data center are shown.

On each of the servers 102*a* to 102*n* runs a virtualization application (not shown) which enables instances, or virtual images, of different operating systems to concurrently execute on each of the servers. For example, server 102*a* may execute a virtualization application that enables the concurrent execution of instances of a Microsoft, Linux, and Solaris operating system, and further enables the concurrently execution of different applications on each of the different operating systems instances, as shown in FIG. 2.

Figure 2:
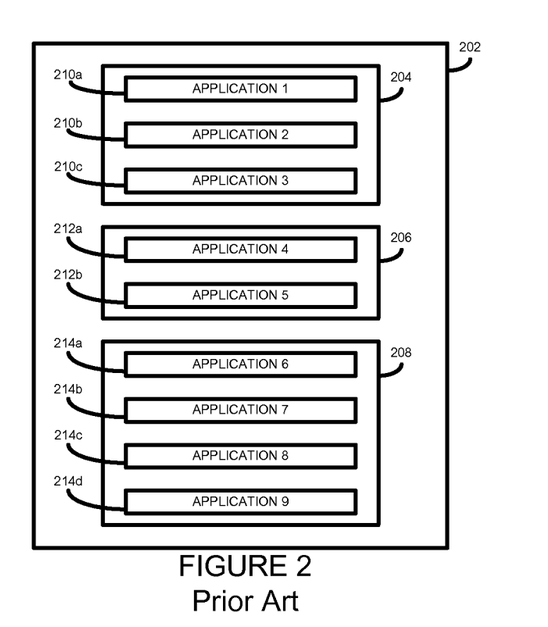
FIG. 2 is a simplified illustration of an example deployment of operating systems and software applications in a computer server.

In the present example, as shown in FIG. 2, a virtualization application 202, such as VMWARE, Inc. VSPHERE application, executes and manages the virtualized execution of three different operating system instances 204, 206, and 208. On the first operating system instance 204 are executed applications 210*a*, 210*b*, and 210*c*. On the second operating system instance 206 are executed applications 212*a* and 212*b*. On the third operating system instance 208 are executed applications 214*a* to 214*d*.

Traditionally, the way in which virtualization applications, operating system instances and applications have been distributed on different computer servers in a data center has been a largely manual process, with one or more system administrators or system architects deciding on the distribution or deployment based on their personal experience and knowledge. One problem with this approach, however, is that due to the difficulty in accurately determining an efficient distribution or deployment of virtualization applications and software applications, system administrators or system architects tend to be over cautious, to avoid the risk of potential server overload, and tend to only lightly load each physical server. Due to the generally abundant amount of processing power available in data centers, such an approach has been generally acceptable. However, such an approach may lead to so-called virtualization or server sprawl in which a large number of physical servers run at low utilization. This can lead to significant inefficiencies with respect to data center power, cooling systems, memory, storage, and physical space.

In order to determine an efficient deployment plan a vast number of factors relating to the software applications to be executed, the operating systems required, virtual images, virtualization applications, and physical hardware may need to be taken into consideration. The factors may include both technical or physical factors as well as business factors.

For a physical computer server example technical factors may include: processing power; multitasking capabilities; memory capacity; storage capacity; and network bandwidth. For a software application example technical factors may include: memory requirements; networking requirements; storage requirements; security requirements; redundancy requirements; and processing power requirements.

Complex interactions may also exist between different software applications. For example, one software application may, for business or security reasons, be the only application allowed to run on a particular physical computer server to ensure that business imposed security requirements are met. Furthermore, such an application may be required to be installed on a stand-alone virtualization application. By way of further example, an application may be dependent on a specific operating system binary library, may require application component level clustering with physical hardware divergence (for example where physical hardware servers are required to be in separate data center enclosures) for redundancy, and so on.

Making sense of all of the different parameters and factors is a particularly challenging and complex task.

Figure 3:
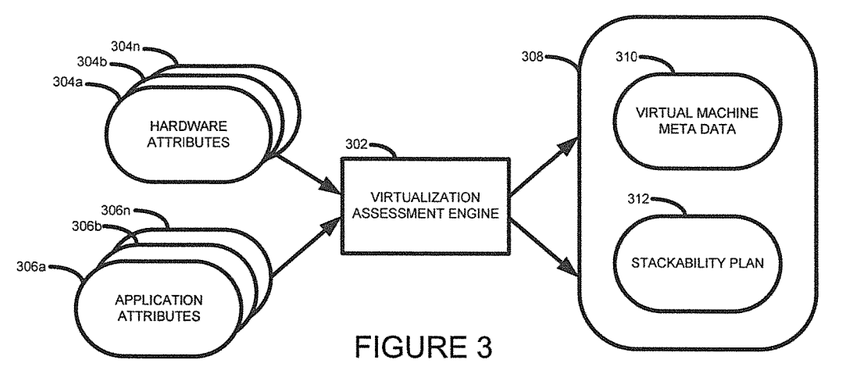
FIG. 3 is a simplified block diagram illustrating a virtualization assessment engine according to an example of the present invention.

Referring now to FIG. 3, there is shown a virtualization assessment engine 302 according to an example. Methods of operating the virtualization assessment engine 302 according to various examples are described below with further reference to the flow diagram of FIG. 4.

In accordance with one or more examples, the virtualization assessment engine 302 is used in an 'analysis mode' to determine an efficient manner of distributing a set of target applications on a given set of target computer hardware.

Figure 4:
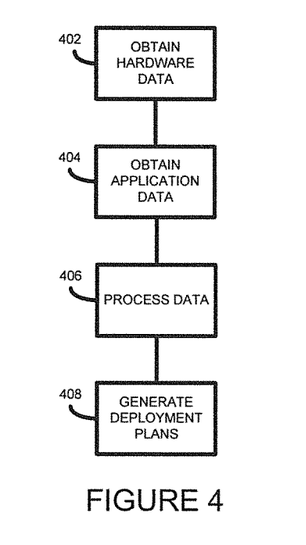
FIG. 4 is a simplified flow diagram outlining a method of operating a virtualization assessment engine according to an example of the present invention.

In one example, the virtualization assessment engine 302 obtains (402) data 304a to 304n relating to a set of computing hardware which are available for running a set of target software applications that are desired to be run in a data center or other computing facility. At 404, the virtualization assessment engine 302 obtains data 306a to 306n relating to the set of target applications. At 406 the virtualization assessment engine 302 processes the obtained data 304 and 306 and generates (408) a deployment plan 308 for appropriately distributing the target applications on the target computing hardware. The deployment plan 308 comprises a plan 310 for distributing operating system virtual images across the available set computing hardware and a plan 312 for distributing, or stacking, the target applications between the different operating system virtual instances.

The data 304 and 306 may, for example, be obtained automatically through use of software agents, software management tools, manually, for example, from a data center administrator or architect, or in any other appropriate manner. The data 306 may include technical characteristics or requirements, including, for example, the operating system on which the application is designed to run, the amount of memory required, the amount of storage required, etc. The data 304 and 306 may additionally comprise business requirements data. The business requirements data may, for example, define business-imposed restrictions or requirements. The business requirements may, for example, be obtained by a data center or system administrator or architect, or in any other appropriate manner.

Figure 5:
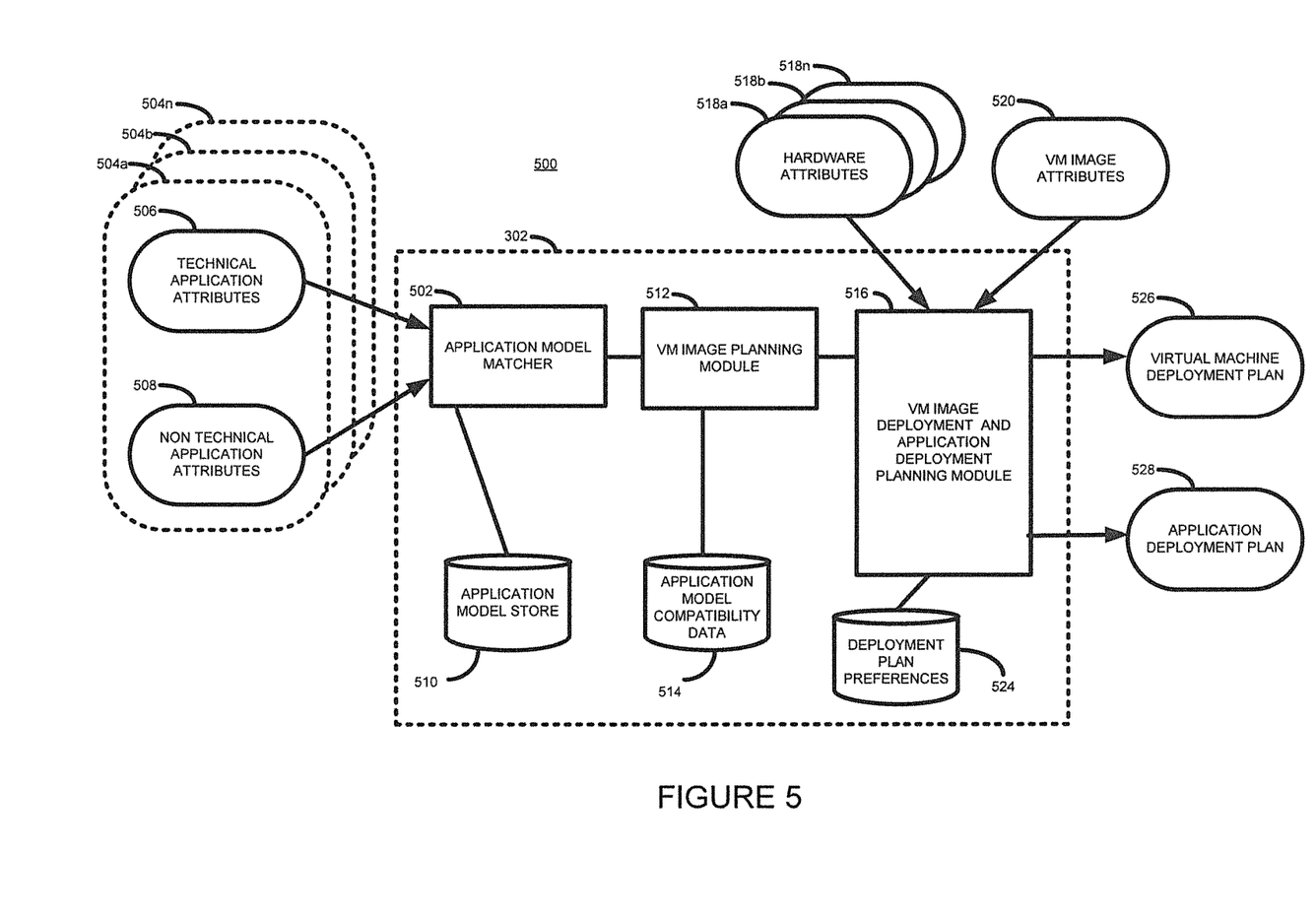
FIG. 5 is a simplified block diagram illustrating a virtualization assessment engine according to an example of the present invention.

Referring now to FIG. 5, there is shown a system 500 in which the virtualization assessment engine 302 is shown in greater detail, according to an example. Further reference is made to FIG. 6 which is a flow diagram outlining a method of operating the virtualization assessment engine 302 according to one example.

Figure 6:
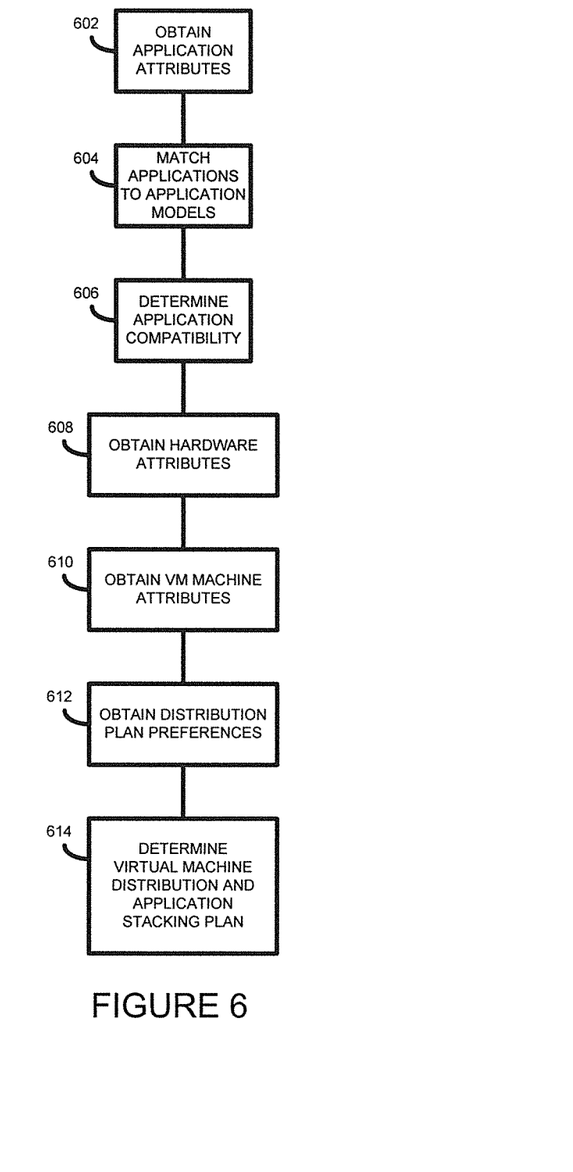
FIG. 6 is a simplified flow diagram outlining a method of operating a virtualization assessment engine according to an example of the present invention.

An application model matcher module 502 obtains (602) a set 504a to 504n of application attributes for a set of target applications which it is desired to install and execute in a virtualized manner on a target set of computing hardware. In the present example, the application attributes include both technical 506 and non-technical 508 application attributes. In other examples, the application attributes 504a to 504n may include attributes other than both technical and non-technical attributes. The non-technical attributes may include, for example, functional requirements that may impact the placement or cohabitation of an application in a virtual environment or on physical hardware. For example, the non-technical attributes may define, from a functional or business aspect, whether an application is allowed to cohabit with other applications in the same virtual machine, or even on the same physical hardware. This may be the case, for example, for an application that has security requirements in which the application owner does not wish for the application to share physical or virtual resources with any other application.

In some examples the set of obtained attributes 504a to 504n include attribute prioritizations or weightings. In other examples, weightings may be allocated once the attributes have been obtained, either manually by a user or automatically by applying predetermined weightings. The weightings may, for example, be used to indicate relative importance of different characteristics.

Example application attributes are shown below in Tables 1 and 2.

TABLE 1

Example application attributes
Application 1

| | |
|---|---|
| Technical attributes | Operating System: Windows 2003 32 bit<br>Minimum memory required: 1 GB<br>Average memory utilization: 3.5 GB<br>Average CPU utilization: 30%<br>Minimum storage required: 500 GB<br>No. of IP addresses required: 1<br>No. of ports required: 10<br>Redundancy level: High<br>. . . |
| Non-technical attributes | PCI Security Requirements: Yes<br>Availability: High<br>Web Server tier with load balancing: Yes<br>Application tier with load balancing: Yes<br>Application tier with component clustering: Yes<br>Data tier with clustering: Yes<br>Data tier with replication: Yes<br>SLA: 99.9%<br>. . . |

TABLE 2

Example application attributes
Application 2

| | |
|---|---|
| Technical attributes | Operating System: Linux<br>Minimum memory required: 2 GB<br>Average memory utilization: 4 GB<br>Average CPU utilization: 60%<br>Minimum storage required: 2 TB<br>No. of IP addresses required: 1<br>No. of ports required: 10<br>Redundancy level: Low<br>. . . |
| Non-technical attributes | PCI Security Requirements: No<br>Availability: Low<br>Web Server tier with load balancing: No<br>Application tier with load balancing: No<br>Application tier with component clustering: No<br>Data tier with clustering: No<br>Data tier with replication: No<br>SLA: 98%<br>. . . |

In some examples the application attributes may be defined using a markup language such as the extensible markup language (XML).

The system 500 comprises an application model store 510 in which is stored a set of predetermined application models.

Each application model may be defined through analysis of different software applications that may be desired to be run in a data center. Such analysis may suitably be performed by a system administrator or architect, or by an application analysis module or tool (not shown). Each application model aims to provide a unique, or substantially unique, set of technical and/or non-technical attributes that identify key application characteristics. Some application models may have only technical attributes, whereas other application models may have both technical and non-technical attributes.

Example application models are shown below in Tables 3 and 4.

TABLE 3

| Example application model Application Model A | |
|---|---|
| Technical attributes | Operating System: Linux<br>Minimum memory required: 2 GB<br>Average memory utilization: 4 GB<br>Average CPU utilization: 30%<br>Minimum storage required: 500 GB<br>No. of IP addresses required: 1<br>No. of ports required: 10<br>Redundancy level: Low<br>. . . |
| Non-technical attributes | PCI Security Requirements: No<br>Availability: Low<br>Web Server tier with load balancing: No<br>Application tier with load balancing: No<br>. . . |

TABLE 4

| Example application model Application Model B | |
|---|---|
| Technical attributes | Operating System: Microsoft Windows<br>Window 2008 64 bit<br>Minimum memory required: 2 GB<br>Average memory utilization: 4 GB<br>Average CPU utilization: 60%<br>Minimum storage required: 1 TB<br>No. of IP addresses required: 1<br>No. of ports required: 10<br>Redundancy level: High<br>. . . |
| Non-technical attributes | PCI Security Requirements: Yes<br>Availability: High<br>Web Server tier with load balancing: Yes<br>Application tier with load balancing: Yes<br>. . . |

In some examples the application models may be defined using a mark-up language such as XML.

At 604 the application model matcher 502 attempts to match or to assign each of the target applications for which application attributes 504 are obtained to an application model stored in the application model store 510.

In one example the matching or assignment process may, for example, be performed by searching for an application model that exactly matches each of the obtained application attributes 504 for a given application. In other examples, the matching process may, for example, be performed by searching for an application model that best matches, or substantially matches, at least some of the obtained application attributes, or matches with a predetermined degree of similarity. For example, some or all of the application attributes may have associated weightings defining an importance level or acceptable similarity level. Suitable XML parsing techniques may be used in some examples, where appropriate.

Once each of the application attributes for each target application have been matched or assigned to an application model the results are passed to a virtual machine image planning module 512.

The virtual machine image planning module 512 obtains application model compatibility data stored in an application model compatibility data store 514. In some examples the application model compatibility data may be stored together with the application model data.

The application model compatibility data defines which application models are compatible with which other application models in a virtualized environment and, by inference, defines which application models are incompatible with which other application models. An example is shown in Table 5 below.

TABLE 5

| Example application model compatibility | |
|---|---|
| Application Model | Compatible with models: |
| Application Model A | B, D |
| Application Model B | A, D |
| Application Model C | E, F, G |
| Application Model D | A, B |
| . . . | . . . |

Compatibility of one application model with another may be determined by analysis of the technical and non-technical application attributes. The analysis may be performed, for example, by a system administrator or system architect, through use of application analysis tools, process monitors, or in any suitable manner.

For instance, an application model requiring a Linux operating system may be determined to be incompatible with an application requiring a Windows operating system. Similarly, an application model in which application component clustering is required may be determined to be incompatible with an application model in which application clustering is not required.

The virtual machine image planning module 512 determines (606), using the application model compatibility data, which applications are compatible with each other and thus which applications may cohabit with which other applications in a given virtual machine image or on the same physical hardware. For example, applications for which their corresponding application models may be determined as being non-compatible are determined as not being able to cohabit with each other. For example, applications requiring the Linux system may be determined as not being able to cohabit in a virtual machine image of the Windows operating system. By way of further example, applications having attributes defining that server sharing is not allowed would not be allowed to cohabit with other applications, even with applications requiring the same operating system.

The virtual image planning module 512 thus determines the minimum number of virtual machine instances of each operating system necessary to execute the set of target applications, and details of which applications should and should not be collocated in the same operating system instance. The virtual image planning module 512 also determines appropriate configuration parameters for each virtual image. However, this initial determination is made without any reference to the available hardware resources. As described below, it may be determined that a greater number of virtual machine images are required depending on the characteristics of the actual physical hardware available.

The determined details are passed to a virtual machine image deployment and application deployment planning module 516.

One particular advantage of having a set of application models and predetermined compatibility between those models is that it reduces the task of determining whether different applications are compatible with each other to the relatively straightforward operation of pattern matching key characteristics of a target application to characteristics of a set of application models.

The virtual machine deployment and application deployment planning module 516 obtains (608) physical hardware attributes 518 which define physical attributes of an available set of target hardware on which the applications may be executed. The physical attributes may be obtained, for example, by a system administrator, through data supplied by hardware manufacturers, through software monitoring applications, software agents, or in any other suitable manner.

The virtual machine deployment and application deployment planning module 516 also obtains (610) virtual machine image attributes 520 which define attributes of available target virtual machine images. The virtual machine image attributes 520 may include details of minimum hardware resources required, number of execution threads possible, and other appropriate characteristics. The virtual machine attributes 520 may be obtained, for example, by a system administrator or system architect, through data supplied by virtual machine developers or suppliers, through software monitoring applications, software agents, or in any other suitable manner.

The virtual machine deployment and application deployment planning module 516 also obtains (612) deployment plan preference data stored in a deployment plan preference data store 524. The deployment plan preference data may be set by a system administrator or system architect, or a default predetermined set of deployment plan preferences may be defined. The deployment plan preferences determine preferences that are to be taken into account by the module 516. The deployment plan preferences are taken into account, along with the hardware attributes 518 and the VM image attributes 520, so that the VM image deployment and application deployment planning module 516 produces a virtual machine deployment plan 526 and application deployment or stackability plan 528. For example, the preferences may define specific limitations or thresholds for the use of hardware by the virtual images. In one example the preferences may define a maximum amount of CPU utilization for a hardware device. Use of the plan preferences enables a final deployment and stacking plan to be tailored to specific system administrator or system architects requirements.

In one example the virtual machine deployment and application deployment planning module 516 analyzes each application in turn and assigns each application to a virtual image, taking into account the resources required by other applications assigned to the same virtual image. If the virtual machine deployment and application deployment planning module 516 determines that the virtual machine image resources would be exceeded by adding the application to the virtual image, a different virtual image is sought on which to place the application. If a suitable virtual image is found, the application is assigned to the found virtual image. If no suitable virtual image is found, a new virtual image is allocated, and the application is assigned to the new virtual image.

Depending on the number and type of applications in the set of target applications and on the characteristics of the available computing hardware, the module 516 may determine that there are insufficient hardware resources to support all of the applications. In this case, an error message or alert may be generated.

Using the obtained information the virtual machine deployment and application deployment planning module 516 determines (614) one or more virtual image deployment plans 526 and one or more application deployment or stacking plans 528. A virtual image deployment plan defines the type and number of virtual images that are determined to be suitable for hosting or executing the set of applications. A virtual image deployment plan 526 additionally defines on which physical hardware which of the defined virtual images should be installed. An application deployment or stacking plan 528 defines which of the target applications should be installed on which of the virtual images.

In some examples the virtual machine image deployment and application deployment planning module 516 calculates, for different combinations of target hardware and target applications, different virtual machine deployment plans 526 and application stacking plans 528 using appropriate ones of the application, hardware, and virtual machine attributes.

The module 516 may therefore determine, for example, that additional virtual machine images are required to be installed on a different computer server in order that all of the target applications are executable on the set of target hardware. This may be the case, for example, if only a single virtual machine image is theoretically required (for example if all of the target applications are compatible with one another), but that the hardware requirements (such as memory, CPU requirements, etc) for the combined target set of applications exceed the hardware requirements supported by a given physical server. In this case, a second virtual machine image may be added on a further physical server in order that the hardware requirements of each physical server are not exceeded. Additionally, other factors, such as redundancy requirements may influence the number of virtual machine and physical machines identified as being required.

In one example the module 516 determines multiple different combinations of virtual machines and application deployments and may rank the different combinations based on one or more different parameters. The module 516 may rank the different combinations based on different criteria, including, for example, the smallest number of virtual machine images, the smallest number of physical servers, the highest number of applications per virtual machine image, etc. The module 516 may automatically select one of the deployment plans as being the preferred deployment plan based on some predetermined preferences, such as preferences stored in the preference data store 524. In a further example a list of different deployment plans may be presented to a system administrator or architect for manual selection of a preferred deployment plan. The presentation may be made, for example, via a visual display unit (not shown) associated with the virtualization assessment engine 302.

The determined virtual machine and application deployment plans 526 and 528 may be output in the form of appropriate metadata, for example in an XML format, that may be used by virtualization management applications to automatically configure the target hardware with appropriate virtual machine images, and appropriately distribute the target applications in accordance with the selected virtual machine and application deployment plan.

Figure 7:
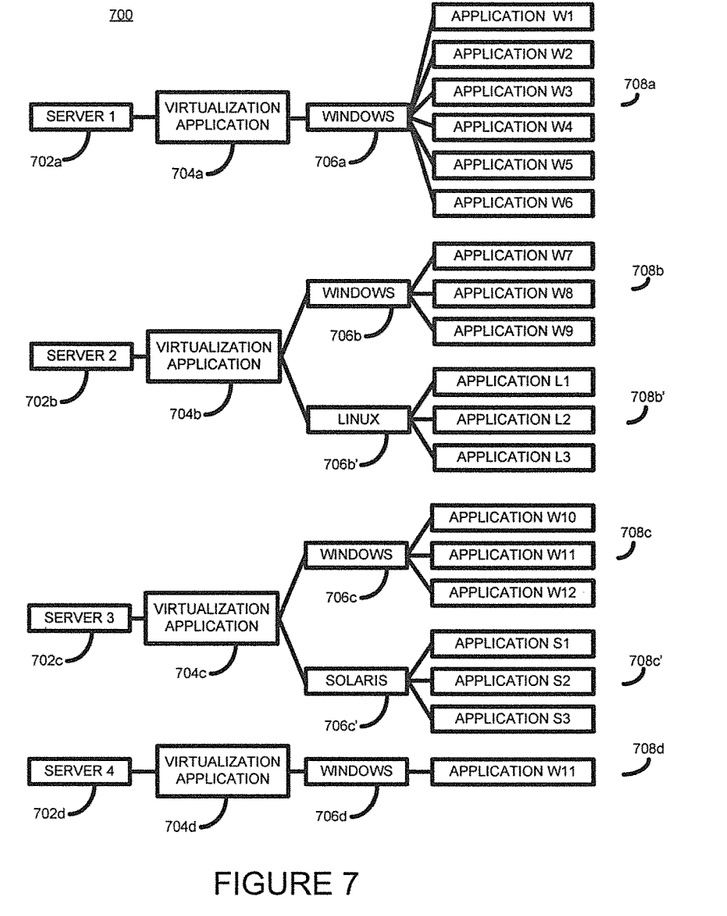
FIG. 7 is an illustration of a virtual image and application deployment plan according to one example of the present invention.

An example illustration of a virtual image and application deployment plan is shown in FIG. 7. A number of physical servers 702a to 702d are shown, each running a virtualization application 704a to 704d respectively. Server 702a runs a single Windows virtual image 706a on which run a number of Windows applications 708a. Server 702b runs a Windows virtual image 706b on which run Windows applications 708*b*, and a Linux virtual image 706*b*' on which run Linux applications 708*b*'. Server 702*c* runs a Windows virtual image 706*c* on which run Windows applications 708*c*, and a Solaris virtual image 706*c*' on which run Solaris applications 708*c*'. Finally, a server 702*d* runs a Windows virtual image 706*d* on which runs a single Windows application 708*d*.

In a yet further example the application model matcher module 502 is configured to create a new application model when it determined that the set of application attributes 504 for an application do not suitably match any application models currently stored in the application model store 510. In one example if a set of application attributes only partially match an existing application model, a new application model may be created by determining the closest matching application model and copying part of the determined closest matching application model and modifying it to create new model attributes for the non-matching elements. The newly generated application model may be stored in the application model store 510 for future use. In one example, an alert may be triggered when a new application model is created, for example to allow a system administrator or architect to update or verify the newly created application model and to add, if required, application model compatibility data to the application compatibility data store 514.

Figure 8:
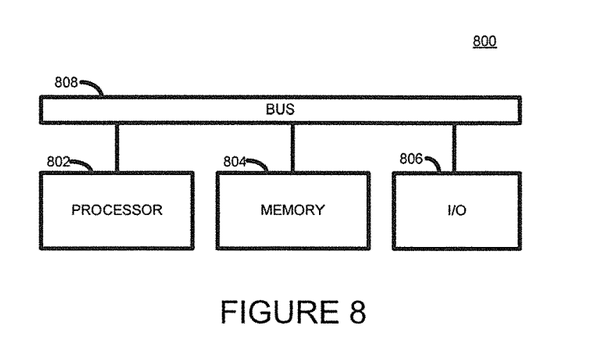
FIG. 8 is a simplified block diagram illustrating an implementation of a virtualization assessment engine according to one example of the present invention.

Referring now to FIG. 8 there is shown a block diagram of an example implementation of the virtualization assessment engine 302. The virtualization assessment engine 302 comprises a microprocessor, control logic, or micro controller 802 for executing machine readable instructions stored in a memory 804. The machine readable or computer executable instructions may, when executed by the processor 802, perform method steps as described above as a computer implemented method. Input and output operations may be handled by an I/O module 806. The processor 802, memory 804, and I/O interface 806 are coupled or are in communication via a bus 808.

In a further example a carrier carrying computer-implementable instructions is provided that, when interpreted by a computer, cause the computer to perform a method in accordance with any of the above-described examples.

It will be appreciated that examples can be realized in the form of hardware, software or a combination of hardware and software. Any such software may be stored in the form of tangible volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed implement examples of the present invention.

Accordingly, examples may provide a program comprising code for implementing a system or method as claimed in any preceding claim and a machine readable storage storing such a program. Still further, examples may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of determining a deployment of applications in a computer system comprising a plurality of computing hardware, comprising:
    obtaining, for each of a plurality of applications, application characteristics;
    assigning each of the plurality of applications, using the obtained characteristics, to one of a plurality of predetermined application models;
    determining which of the assigned application models are compatible and incompatible with each other; and
    determining a virtual server deployment plan to deploy virtual servers on the plurality of computing hardware and an application deployment plan to install the plurality of applications on the deployed virtual servers, the determination based in part on characteristics of the computer system, characteristics of the plurality of applications, and the determination of which assigned application models are compatible and incompatible with each other.

2. The method of claim 1, where the step of determining a virtual server deployment plan comprises determining a type and number of virtual servers suitable for executing a set of applications from the plurality of applications to be deployed on each of the plurality of computing hardware.

3. The method of claim 2, wherein the step of determining an application deployment plan comprises determining which applications are to be deployed on which of the virtual servers.

4. The method of claim 1, wherein the step of assigning further comprises determining whether an application matches an application model to a predetermined degree of similarity.

5. The method of claim 1, wherein the step of assigning further comprises, where it is determined that an application does not suitably match any of the predetermined application models, generating a new application model based on the characteristics of the application.

6. The method of claim 5, wherein the step of generating a new application model comprises determining a closest matching application model and generating a new application model by modifying the determined closest matching application model.

7. The method of claim 1, wherein the step of determining a virtual server deployment plan and an application deployment plan further comprises obtaining deployment plan preferences and determining the deployment plans based on the deployment plan preferences.

8. The method of claim 1, wherein the step of determining a virtual server deployment plan and an application deployment plan further comprises:
    determining a plurality of different virtual server deployment plans and corresponding application deployment plans, each of the plurality of different plans determined based on different combinations of the application characteristics and the computer system characteristics; and
    selecting one of the plurality of determined deployment plans based on obtained deployment plan preferences.

9. The method of claim 1, further comprising sending the determined virtual machine and application deployment plans to a virtualization management application, wherein the virtualization management application deploys the virtual servers and the applications in accordance with the determined virtual server and application deployment plans.

10. A system, comprising a processor, a memory in communication with the processor, and computer executable instructions stored in the memory and executable on the processor to:
obtain a set of characteristics for each of a plurality of applications;
match, using the obtained characteristics, each of the applications to a predetermined application model;
determine which of the matched application models are compatible and incompatible with each other; and
generate a virtual server distribution plan to deploy virtual servers on computing hardware and an application distribution plan to install the plurality of applications on the deployed virtual servers, the generation based in part on characteristics of the applications, characteristics of the computer hardware, and the determination of which matched application models are compatible and incompatible with each other.

11. The system of claim 10, wherein the computer executable instructions further include instructions to:
determine a type and number of the virtual servers suitable for hosting the set of application to be distributed on each of the plurality of computing hardware.

12. The system of claim 10, wherein the computer executable instructions to match an application to an application model further include instructions to:
obtain a set of predetermined preferences; and
determine whether there is a degree of similarity defined in the preferences between the application and the application model.

13. The system of claim 12, wherein the computer executable instructions further include instructions to:
where it is determined that an application does not match any of the application models, generate a new application model based on the characteristics of the application, and store the generated application model in an application model data store.

14. The system of claim 10, wherein the computer executable instructions further include instructions to:
obtain a set of predetermined preferences; and
generate the virtual server distribution plan and the application distribution plan based in part on the set of predetermined preferences.

15. The system of claim 10, wherein the computer executable instructions to generate the virtual server distribution plan and the application distribution plan further include instructions to:
generate a plurality of virtual server distribution plans and application distribution plans; and
select one of the virtual server distribution plans and one of the application distribution plans in accordance with obtained preference data.

16. A virtual assessment engine comprising:
a hardware processor, wherein the hardware processor is to:
obtain, for each of a plurality of applications, application characteristics;
assign each of the plurality of applications to one of a plurality of predetermined application models according to the application characteristics for each application;
determine which of the assigned application models are compatible and incompatible with each other; and
determine a virtual machine deployment plan to deploy virtual machines on computing hardware and an application deployment plan to install the plurality of applications on the deployed virtual machines, the determination based in part on characteristics of the computing hardware, characteristics of the plurality of applications, and the determination of which assigned application models are compatible and incompatible with each other.

17. The virtual assessment engine of claim 16, wherein the processor is to determine a type and number of the virtual machine for the virtual machine deployment plan.

18. The virtual assessment engine of claim 16, wherein the processor is to:
determine whether an application matches an application model to a predetermined degree of similarity; and
where it is determined that an application does not suitably match any of the predetermined application models, generate a new application model based on the characteristics of the application, wherein generating a new application model comprises determining a closest matching application model and generating a new application model by modifying the determined closest matching application model.

19. The virtual assessment engine of claim 16, wherein the processor is to:
obtain deployment plan preferences; and
determine the virtual machine deployment plan and the application deployment plan based on the deployment plan preferences.

20. The virtual assessment engine of claim 16, wherein the processor is to:
determine a plurality of different virtual machine deployment plans and corresponding application deployment plans, each of the plurality of different plans determined based on different combinations of the characteristics of the plurality of applications and the characteristics of the computing hardware; and
select one of the plurality of determined deployment plans based on obtained deployment plan preferences.

* * * * *